(12) United States Patent  
Bowen

(10) Patent No.: US 6,276,891 B1  
(45) Date of Patent: Aug. 21, 2001

(54) SOFT TOUCH VACUUM BAR

(75) Inventor: Wayne Martin Bowen, Herriman, UT (US)

(73) Assignee: Automated Manufacturing Technology, Inc., West Jordan, UT (US)

( * ) Notice: Subject to any disclaimer, the term of this patent is extended or adjusted under 35 U.S.C. 154(b) by 0 days.

(21) Appl. No.: 09/133,290

(22) Filed: Aug. 12, 1998

(51) Int. Cl.$^7$ .................................................. B65G 59/04

(52) U.S. Cl. .................... 414/627; 414/797; 414/225.01; 294/65

(58) Field of Search ........................... 414/626, 627, 414/744.3, 797, 752.1, 225.01, 416; 254/93 R; 294/65, 87.1, 87.12; 29/740, 743; 271/103, 104, 105

(56) References Cited

U.S. PATENT DOCUMENTS

| | | | |
|---|---|---|---|
| 3,834,558 | * | 9/1974 | Bru ..................................... 414/797 X |
| 3,884,368 | * | 5/1975 | Ballard ................................. 414/797 |
| 4,129,328 | * | 12/1978 | Littell ..................................... 294/65 |
| 5,244,343 | * | 9/1993 | Lockert ................................. 414/797 |

FOREIGN PATENT DOCUMENTS 3-95022  *  4/1991  (JP) ...................................... 414/797

* cited by examiner

Primary Examiner—Frank E. Werner

(57) ABSTRACT

In a workpiece pick up and transport mechanism, a shaft of a vacuum cup pick up bar is slideably interconnected with a shaft guide mounted on the pick up mechanism frame. The shaft also slideably engages a shaft collar of a pneumatic cylinder body. Operation of the air cylinder causes the shaft collar to lower the respective shafts of the vacuum cup bar until the vacuum cups come in contact with the target workpiece. Further movement of the air cylinder body causes the shaft collar to slide down the shaft thereby eliminating any overrun of the pneumatic cylinder and eliminates any pressure of the cylinder being applied to the shaft, thereby preventing such pressure from being transmitted to the vacuum cup tray and to the workpiece. The only force applied to the vacuum cup tray and to the workpiece is through the action of gravity. Vacuum is applied and the workpiece is attached to the vacuum cups and the pick up mechanism then moves the body of the pneumatic cylinder upward to lift the workpiece. The shaft collar engages the end of the guided shaft which has a nut or a flanged end larger than the diameter of the guided shaft and the hole in the shaft collar, and lifts the vacuum cup bar along with the workpiece. The entire frame may be moved to another work location, the process reversed and then the frame returned for another pickup

5 Claims, 6 Drawing Sheets

SOFT TOUCH VACUUM BAR

BACKGROUND OF THE INVENTION

1. Field of the Invention

This invention relates to the field of vacuum driven circuit board pick up mechanisms. More specifically this invention relates to pick up mechanisms which are moved into contact with a work piece such as a circuit board and is attached thereto such that the work piece may be lifted away to another work area.

2. Description of the Related Art

Existing systems using vacuum usually apply pressure to a cylinder or equivalent device to move a pick up mechanism to engagement with a stack of circuit boards during a pick up cycle. However, the existing systems permit pressure from the cylinders to be applied directly to the stack of circuit boards and, in fact, to various vacuum cups or other devices which directly engage with the work piece. This can result in damage to the work piece, increases the stress on the pick up table and the vacuum assembly supporting the vacuum cups due to increased pressure and is replete with safety problems including the possibility of applying a crushing force to hands or other appendages of the workers using such equipment. In addition, because of the pressing of one board against a stack of boards, double feeding can result. That is, the picking up of two boards due to vacuum pressure between the two adjacent surfaces is increased by the increased pressure pressing the boards together which can evacuate any air between such surfaces the instant invention reduces the pressure applied to the stack of circuit board material, reduces the potential of material damage and be used to pick up a work piece from an uneven surface or from various different load height positions. It is also less likely to cause injury because the cylinder force is eliminated and the actual force applied to the work piece is minimized.

SUMMARY OF THE INVENTION

The current invention is characterized by a doubling acting air cylinder mounted at each end of the pick up mechanism which engages shafts mounted to a vacuum cup bar. The shaft of the vacuum cup pick up bar is slideably interconnected with a shaft guide mounted on the pick up mechanism frame. The shaft also slideably engages a shaft collar of a pneumatic cylinder body. Operation of the air cylinder causes the shaft collar to lower the respective guided shafts of the vacuum cup bar until the vacuum cups come in contact with the target circuit board. Further movement of the air cylinder body causes the shaft collar to slide down the guided shaft thereby eliminating any overrun of the air cylinder and eliminates any pressure of the cylinder being applied to the guided shaft, thereby preventing such pressure from being transmitted to the vacuum cup tray. The only force applied to the vacuum cup tray and therefore to the target circuit board is through the action of gravity. Vacuum is applied and the pick up mechanism then moves the body of the pneumatic cylinder upward. The shaft collar engages the end of the guided shaft which has a nut or a flanged end larger than the diameter of the guided shaft and the hole in the shaft collar, and lifts the vacuum cup bar along with the circuit board into another work location. In this way, the pneumatic cylinders move the vacuum cup bar up and down as required to engage, lift, transport and place individual ones of circuit boards from one place to another without damages. During such transport, the vacuum cups come in contact with a stack of circuit boards and vacuum bar travel stops while the cylinders continue to move to the full extent of stroke without applying additional pressure to the cups or to the circuit board materials. The pick up mechanism may then be moved to another location where the operation is reversed the vacuum is removed from the vacuum cups and the vacuum tray.

DESCRIPTION OF THE PREFERRED EMBODIMENT

Figure 1:
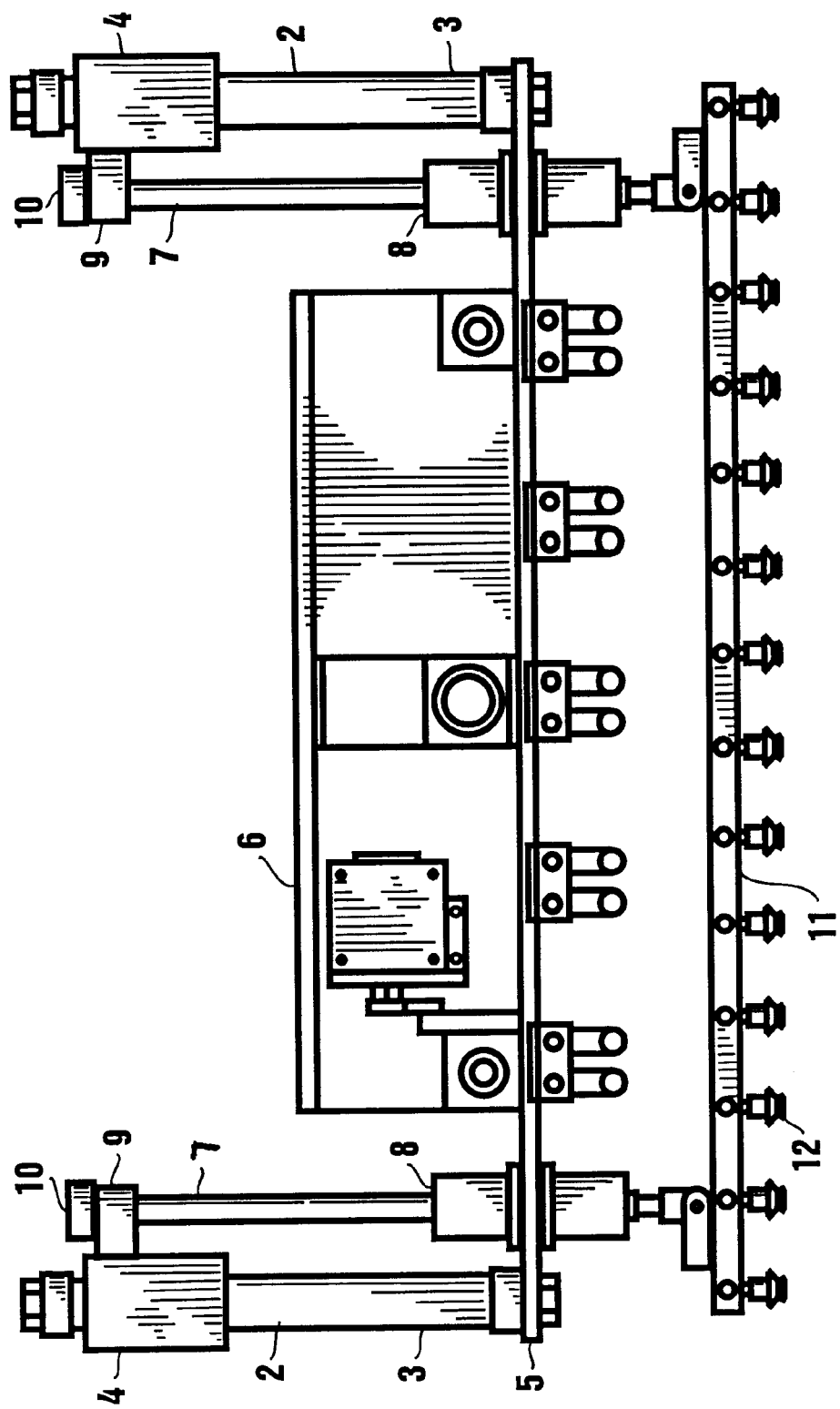
FIG. 1 is a side view of the frame and the vacuum cup bar in a raised position.
Figure 2:
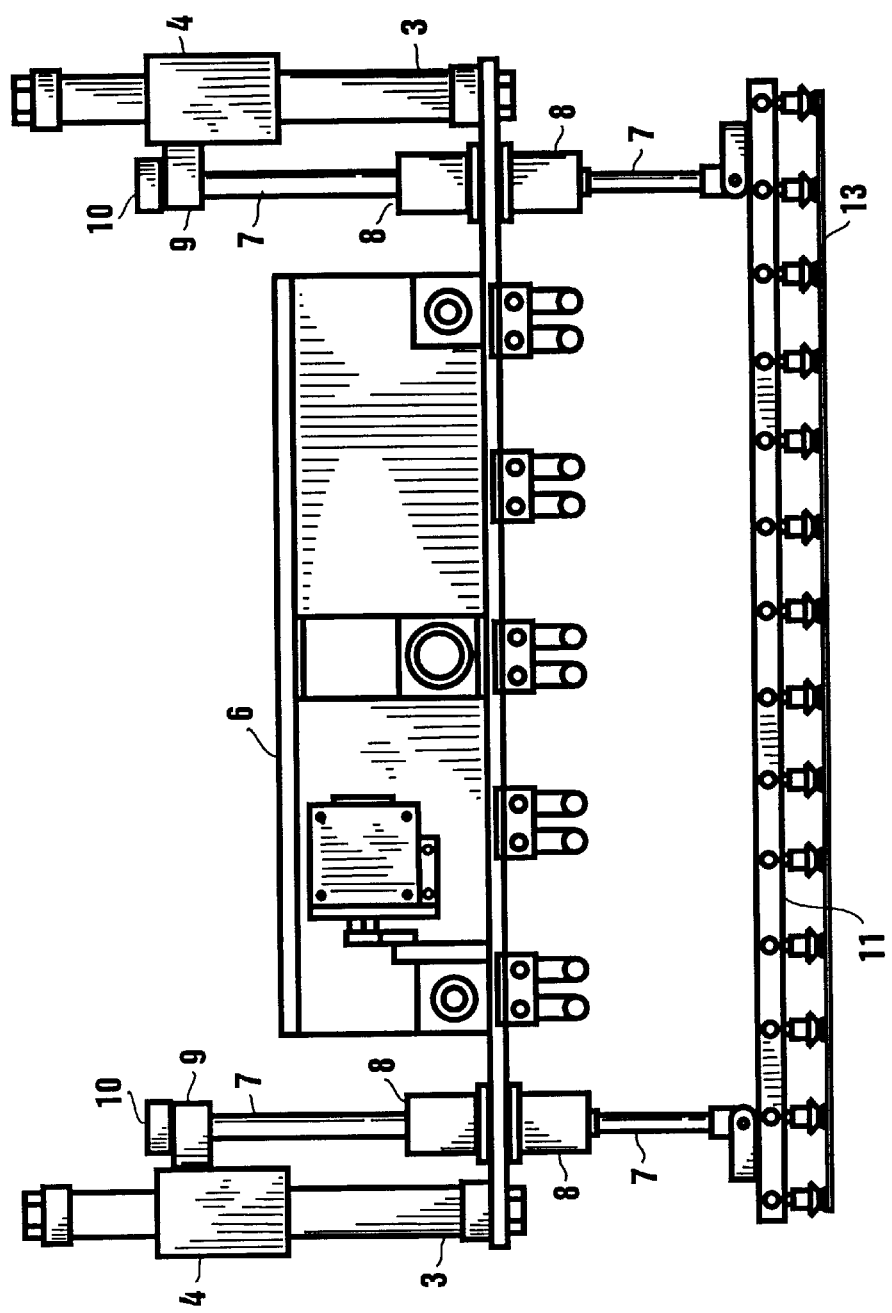
FIG. 2 is a side view of the frame and the vacuum cup bar in a lowered position engaging the workpiece.
Figure 3:
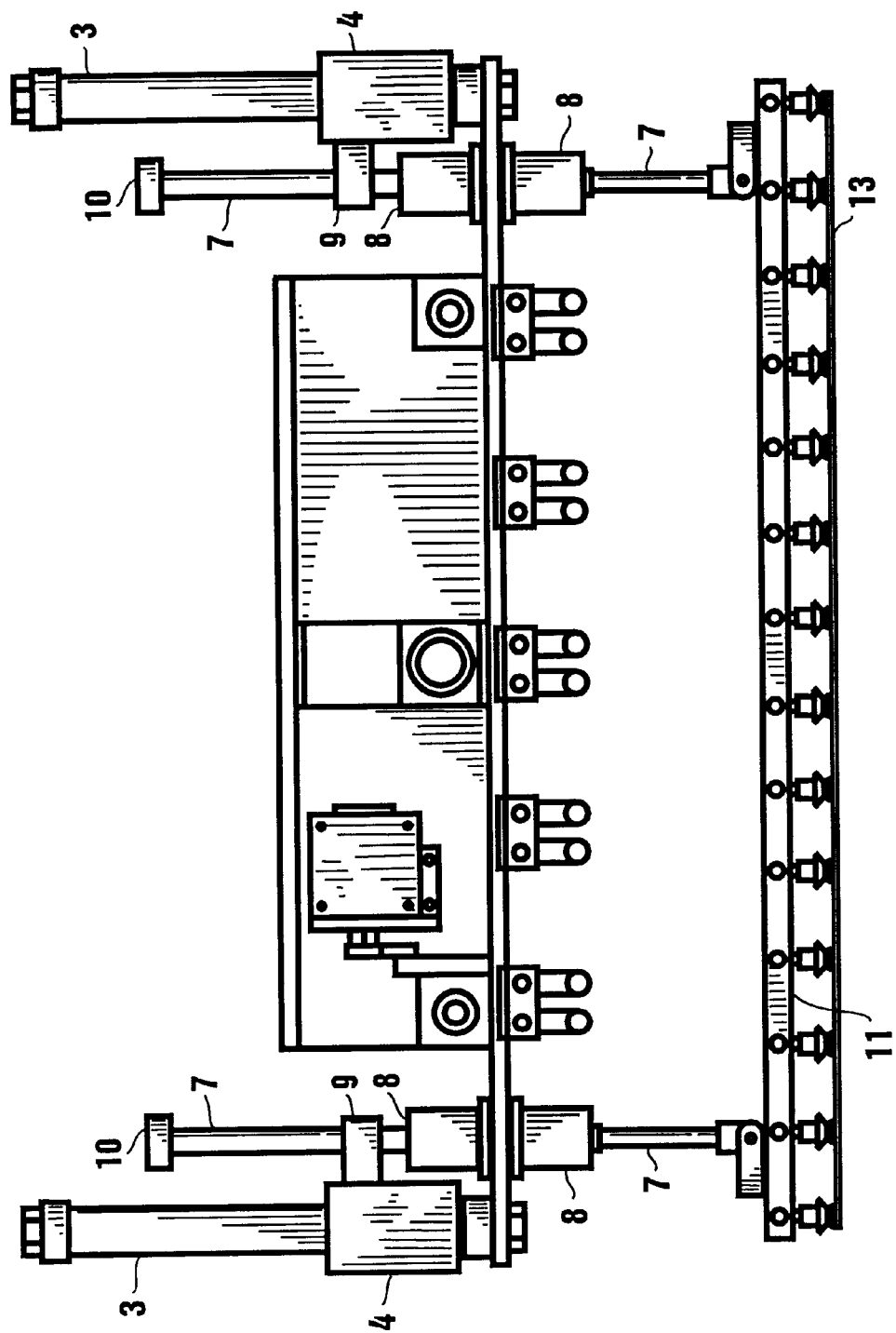
FIG. 3 is a side view of the frame and the vacuum cup bar in a lowered position engaging the workpiece and the housing of the cylinder moved to its lowest point.

FIG. 1 shows the pick up mechanism 1 having a pneumatic cylinder 2 with a push rod 3 and a body 4. The push rod is attached to the frame 5 which supports the structure. A vacuum supply unit 6 is also mounted thereon and the frame 5 also support a pair of vacuum cup bar shafts 7 which are slideably coupled to the frame 5 through a pair of shaft guides 8 thereby engaging the frame 9. Each of the pneumatic cylinders have a collar 9 attached to one side thereof slideably receiving the vacuum cup bar shaft 7 at one end thereof A cap or end nut 10 attached to the uppermost end of the vacuum cup bar shaft 7 prevents the vacuum cup bar shaft 7 from sliding through the pneumatic collar shaft guide 9. As pointed out above, the shaft 7 is slideably received by a frame shaft guide 8 and the shaft communicates through the shaft guide 8 and is attached at the opposite lower end to the vacuum bar 11. The shafts 7 and the bar 11 comprising a bar assembly. Mounted along the bottom of the vacuum bar 11 are a plurality of vacuum or suction cups 12 spaced apart along the length of said bar 11 which communicates to vacuum lines attached to the vacuum supply unit 6 through a plurality of hoses, not shown. The vacuum cups include a housing 12a and a flexible cup shaped end 12b made of rubber or plastic or other flexible material. When the cup 12 are pressed against a circuit board and vacuum is introduced, the flexible end 12b attaches through the vacuum to the surface of the circuit board or other work piece. Each vacuum cup 12 can support a weight of approximately 1.3 pounds at a vacuum of −18 inches Hg and the appropriate number of vacuum cups 12 may be selected for whatever work pieces or circuit boards are to be moved. In FIG. 1 the pick up mechanism is in the raised position with the body 4 of the pneumatic cylinders 2 in an upper most position with an pneumatic collar shaft guide 9 holding the end cap 10 of the shaft 7 in the upper most position. In FIG. 2 the body 4 of the pneumatic cylinders 2 has been moved down approximately half the length of the cylinder push rod 3. This has lowered the vacuum cup bar 11 to a work piece 13. In FIG. 3 the body 4 of the pneumatic cylinder 2 has continued its travel down the cylinder push rod 3 to the full extent of its range. However, the vacuum cup shaft 7 has remained in the same position as in FIG. 2 and the shaft 7 has slid up through the collar shaft guide 9 thereby eliminating any pressure against the circuit board 3 and said cups 12 other than the force of gravity. As contact is made in either FIG. 2 or in FIG. 3 the vacuum cups may be energized by the vacuum source 6 and the work piece or board 13 engaged. To lift the work piece the process is reversed and each of the body 4 for the pneumatic cylinder 2 is forced upwards along the push rod 3 into the raised positions as shown in FIG. 1. The entire lifting mechanism may then be moved along with the work piece 13 to any desired location for placement and further processing. The work piece 13 is lowered to the work locations and the vacuum in the suction cups 12 is eliminated. The body 4 of cylinder 3 is moved upwards and lifts the suction cup bar 11 into the upper most raised position as shown in FIG. 1. The transport apparatus is moved to the start position to pick up another work piece. In FIGS. 1, 2 and 3 a single bar is shown although these bars may be used in tandem or any other multiple combinations depending upon the weight and size of the work piece to be moved.

Figure 4:
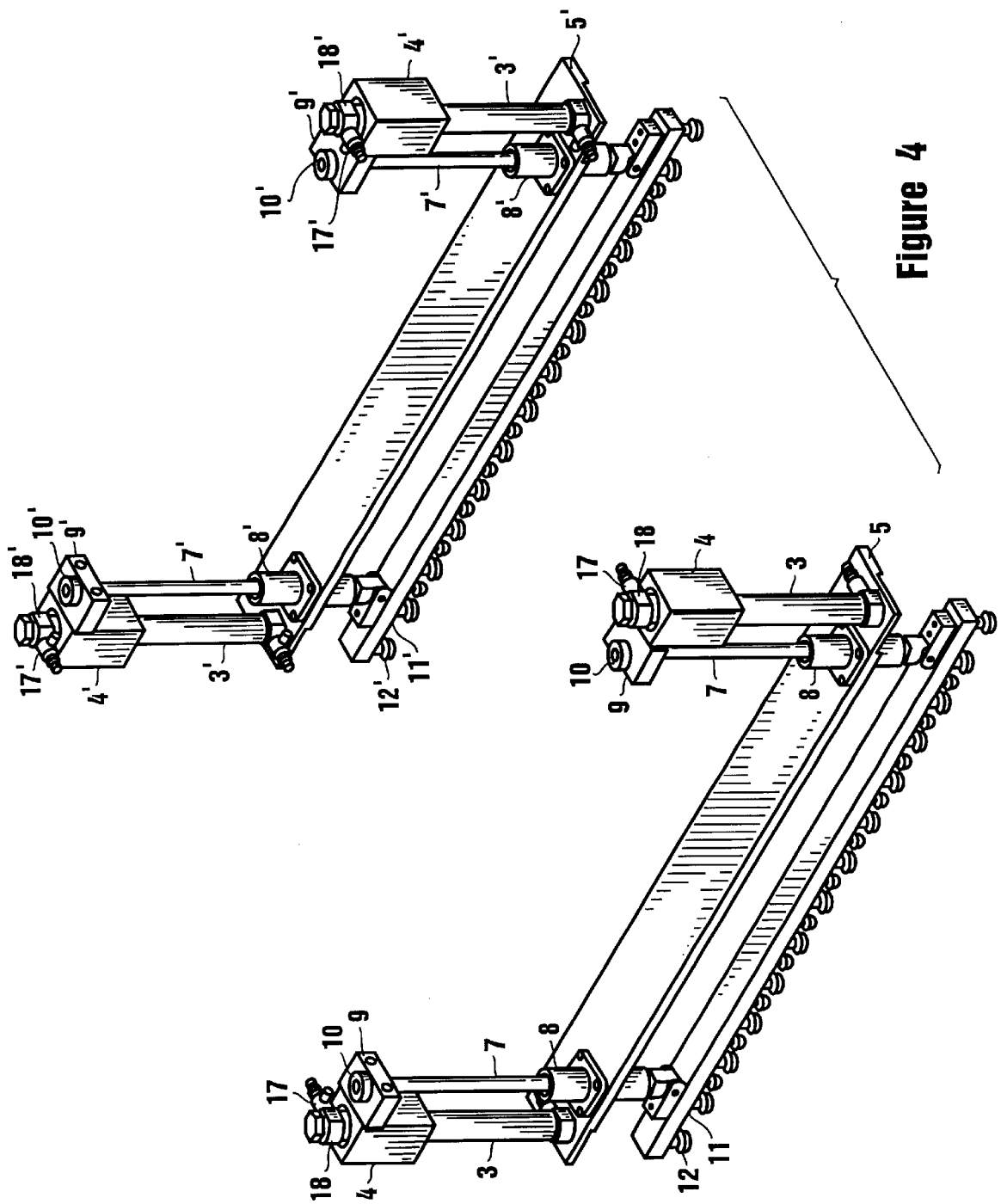
FIG. 4 is a perspective view of four cylinders mounted two two separate vacuum bars.

FIG. 4 shows a tandem arrangement having dual vacuum cup suction bars 11 and 11' each having a plurality of suction cups 12 and 12' mounted thereon. Not all suction cups 12' are designated by reference numerals on the suction cup bar 11' for clarity. When operating in tandem the body 4 of cylinder 3 is moved downward and the suction cup bar 11 moves downward to engage a workpiece. Once engagement of suction cups 12 has been achieved the body 4 of cylinder 3 is moved upwards and lifts the suction cup bar 11 into the upper most raised position as shown in FIG. 1 and lifts one side of the workpiece, thereby breaking any suction between the upper workpiece and any lower workpiece. Similarly, the body 4' of cylinder 3' is moved downward and the suction cup bar 11' moves downward to engage the opposite side of the workpiece. Once engagement of suction cups 12' has been achieved the body 4' of cylinder 3' is moved upwards and lifts the suction cup bar 11' into the upper most raised position as shown in FIG. 1 and lifts the other side of the workpiece, thereby lifting the workpiece from its resting position. In this manner the vacuum cup bars 11 and 11' may be moved upwards by movement of the first vacuum cup bar and then the second and the third and so on depending upon the number of vacuum cup bars utilized. This permits the ease of movement of thin sheets of material and breaks the suction between adjacent sheets in order to prevent multiple feeds. In addition, the vacuum cup bars may be moved up simultaneously to lift the entire workpiece simultaneously. FIG. 4 shaws end cups 18 and 18' for the cylinder 3 and 3' respectively, each of which includes a pneumatic connector 17 or 17' as the case may be.

Figure 5:
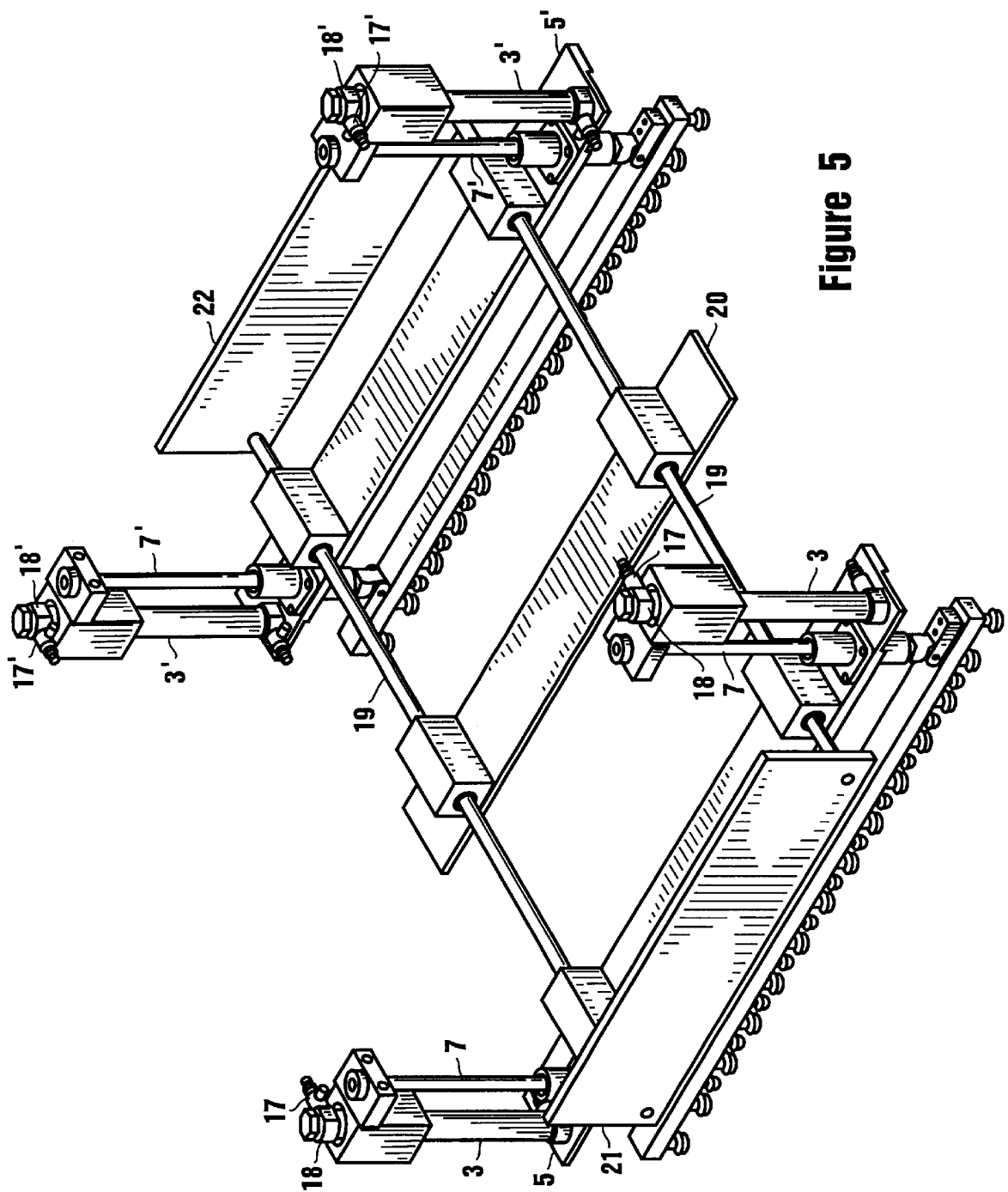
FIG. 5 is a perspective view of the frame having four cylinders mounted thereon and interconnecting side bars, a guide and end caps.

FIG. 5 shows the two frames 5 and 5' connected by a pair of tubular slides 19. A guide 20 spaces the tubular slides 19 apart and the slides slideably engage frames 5 and 5' so that the distances between the two frames may be adjusted to accommodate various sizes of workpieces. The tubular slides 19 terminate in end frame members 2 1 and 22 respectively.

Figure 6:
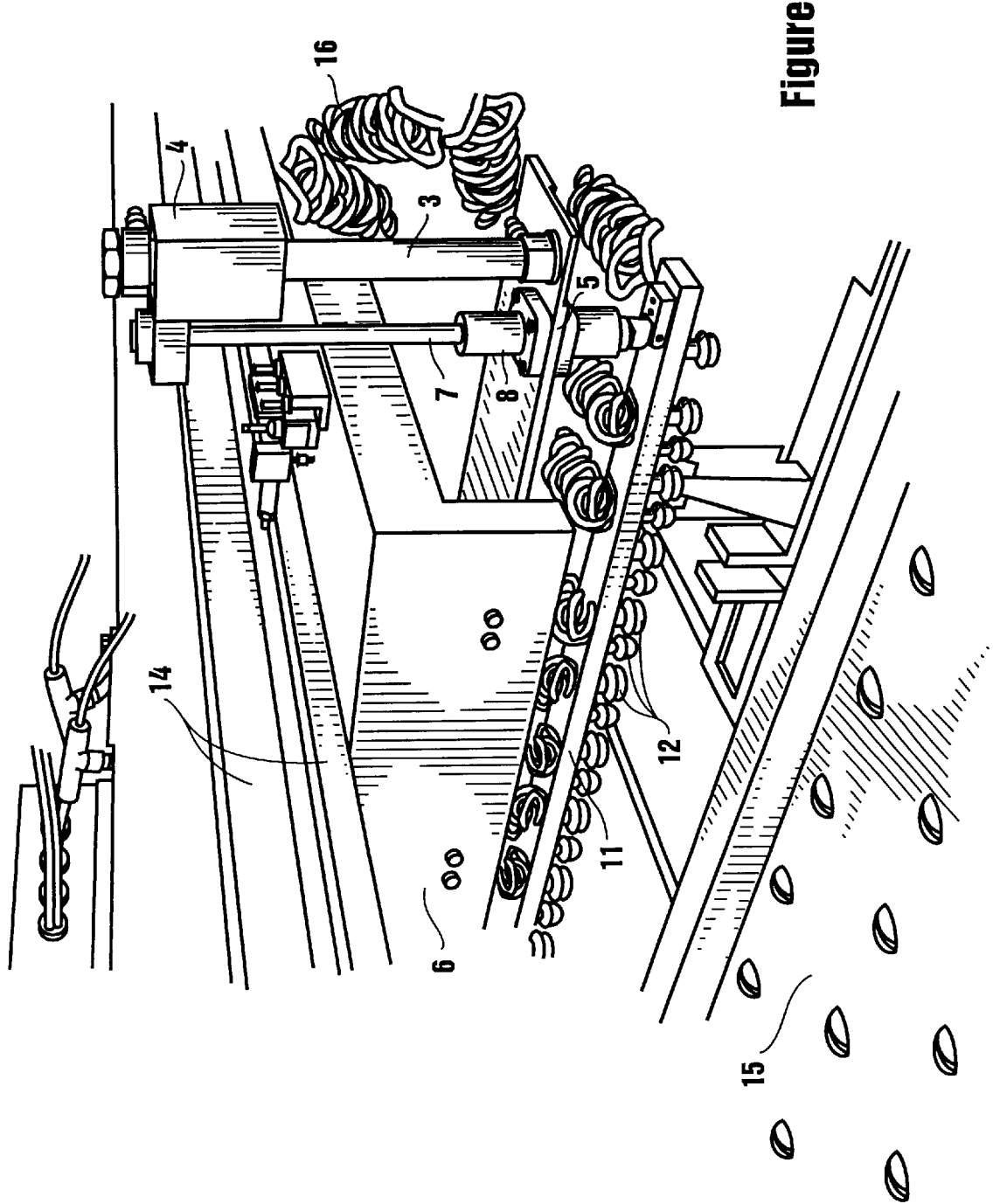
FIG. 6 is a perspective view of the frame mounted on a machine for movement from one work place to another.

FIG. 6 shows a complete frame 5 mounted to a slide 14 along which the frame 5 may travel thereby moving the workpiece from one location to the next. The vacuum cup bar 11 is positioned below the frame 5 and described before. The frame 5 may be moved to a transport conveyer 15 and moved elsewhere in the work environment and the frame 5 returned along slid 14 to retrieve another workpiece 13. FIG. 6 also shows the various vacuum hoses 16 which are connect to the vacuum supply unit 6 and attached to the vacuum cups 12.

It will be clear to those skilled in the art that one pneumatic cylinder and one shaft could be used, or multiple combinations of these devices or alternative embodiments which are considered to be within the scope of this invention.

Having thus described the invention what is being claimed.

What is claimed is:

1. A workpiece transport apparatus comprising:
   a. at least one horizontal frame;
   b. at least one horizontal bar assembly slideably engaging said frame;
   c. a plurality of suction cups for releasably engaging said workpiece attached to said bar assembly; and
   d. a vertical rod engaging said frame and mounted in a housing, said housing providing a controlling force for moveably engaging said bar assembly, said housing capable of releasably engaging said bar assembly at a lower limit of its travel and moving said bar assembly upwardly relative to said frame, whereby the bar assembly may move upwardly and downwardly upon encountering an external force when the housing has reached said lower limit of travel.

2. A work piece transport apparatus as claimed in claim 1 wherein said bar assembly further comprises:
   a. an elongated bar which supports said suction cups; and
   b. at least one shaft attached to said elongated bar at one end, said shaft slideably received by said frame through a hole in said frame and slideably engaging said rod.

3. A workpiece transport apparatus as claimed in claim 2 wherein said shaft is limited in motion relative to said frame by said bar on one side of said frame and by a collar larger than the hole in said frame attached to said shaft on the other side of said frame.

4. A workpiece transport apparatus as claimed in claim 2 further comprising:
   a. a plurality of said shafts; and
   b. a plurality of said housings at least one of said plurality of housings engaging at least one of said shafts and said frame.

5. A workpiece transport apparatus as claimed in claim 4 further comprising: a plurality of shafts slideably received by said frame each engaging said bar at one end and selected ones of said shafts engaging selected ones of said plurality of housings at the other end wherein each of said selected ones of said cylinders slideably receives a selected one of said engaging shafts in a first collar having a hole for receiving said shaft and said shaft having a second collar attached at said other end for limiting the sliding of said shaft in said second collar.

* * * * *